US006947419B2

(12) United States Patent
Liu et al.

(10) Patent No.: US 6,947,419 B2
(45) Date of Patent: Sep. 20, 2005

(54) APPARATUS FOR MULTICAST FORWARDING IN A VIRTUAL LOCAL AREA NETWORK ENVIRONMENT

(75) Inventors: Kuang-Chih Liu, Hsinchu (TW); Fang-Yong Lee, Hsinchu (TW)

(73) Assignee: Acute Technology Corp., Hsinchu (TW)

( * ) Notice: Subject to any disclaimer, the term of this patent is extended or adjusted under 35 U.S.C. 154(b) by 936 days.

(21) Appl. No.: 09/878,990

(22) Filed: Jun. 12, 2001

(65) Prior Publication Data

US 2002/0191628 A1 Dec. 19, 2002

(51) Int. Cl.[7] .............................................. H04Q 11/00
(52) U.S. Cl. ........................ 370/390; 370/432; 709/240
(58) Field of Search .................................. 370/352, 360, 370/389, 390, 392, 395.31, 395.53, 395.54, 400, 401, 411, 412, 428, 432, 444, 452, 463; 709/238–240

(56) References Cited

U.S. PATENT DOCUMENTS

| 5,394,402 A | | 2/1995 | Ross | |
|---|---|---|---|---|
| 5,852,607 A | * | 12/1998 | Chin | .......................... 370/401 |
| 6,384,750 B1 | * | 5/2002 | Brown | ......................... 341/106 |
| 6,614,787 B1 | * | 9/2003 | Jain et al. | .................... 370/390 |
| 6,633,567 B1 | * | 10/2003 | Brown | ..................... 370/395.3 |
| 6,711,163 B1 | * | 3/2004 | Reid et al. | ................... 370/390 |

* cited by examiner

Primary Examiner—Wellington Chin
Assistant Examiner—John Shew
(74) Attorney, Agent, or Firm—Darby & Darby

(57) ABSTRACT

An apparatus distributing multicast messages with a multicast address among the ports of a network device on the basis of, inter alia, virtual local area network (VLAN) associations among the ports. One or more VLANs within the network device are assigned to the multicast address. The apparatus comprises a lookup engine, a forwarding engine coupled to the lookup engine, and a plurality of translation engines. The lookup engine needs to map the multicast address to a unique index value assigned to the multicast address and a bit string representing the group of multicast destination ports only once. The forwarding engine distributes the multicast messages and the unique index value to the group of multicast destination ports of the network device in accordance with the bit string. The translation engines are associated with each port of the network device respectively. Each translation engine independently performs a VLAN identifier (VID) translation in parallel on each port of the network device from the unique index value, the destination port and a VID-select index.

14 Claims, 6 Drawing Sheets

(for port 2, Pid=2)

(for port 2, Pid=2)

APPARATUS FOR MULTICAST FORWARDING IN A VIRTUAL LOCAL AREA NETWORK ENVIRONMENT

FIELD OF THE INVENTION

The present invention relates generally to the distribution of messages in a computer network environment and, more specifically, to the efficient distribution of multicast messages in a virtual local area network environment.

BACKGROUND OF THE INVENTION

A virtual local area network (VLAN) is a switched network that is logically segmented on an organizational basis, by function, project teams, or applications, rather than on a physical or geographical basis. For example, all entities used by a particular workgroup team can be connected to the same VLAN, regardless of their physical connections to the network or the fact that they might be intermingled with other teams. Reconfiguration of the network can be performed through software rather than by physically unplugging and moving devices or wires. Floy E. Ross discloses an arrangement that is capable of associating any port of a switch with any particular segregated network group in U.S. Pat. No. 5,394,402, issued on Feb. 28, 1995. According to this patent, any number of physical ports may be associated with any number of groups within the switch by using a VLAN arrangement that virtually associates the port with a particular VLAN designation. Besides, VLAN switching is accomplished through frame tagging where traffic originating and contained within a particular virtual topology carries a unique VLAN identifier (VID) as it traverses a common backbone or trunk link. The VID allows VLAN switches and routers to selectively forward messages to ports with the same VID in aspect of port-based, address-based, or protocol-based VLAN mechanism. The VID is the identification of the VLAN, which is basically used by the standard 802.1Q (or 802.1v for protocol-based) and, being on 12 bits, it allows the identification of 4096 VLANs.

To improve the flexibility of a network, it is desirable to support the transmission of messages to a predefined group of entities, including entities of diverse VLAN designations. Such a message is known as a group multicast message. For example, a group of entities may wish to receive certain types of messages originating from a source entity. These entities typically register with one or more network devices (e.g., routers or multi-layer switches) which control the transmission of messages across VLAN boundaries. Registration may be accomplished via the Internet Group Management Protocol (IGMP) that defines operations that may be used by entities to join a group. The network device may employ a security mechanism to prevent entities having a particular VLAN designation from subscribing to multicast messages to which they are not entitled.

Upon receiving a multicast message, a conventional network device examines a multicast address of the multicast message and a VLAN group list associated with the multicast address. The VLAN group list includes a list of entries. Each entry has its respective VID and a multicast destination subset associated with the VID. The multicast destination subset is usually in the form of a bitmap called port-on-exit (POE). Every active bit in POE stands for a destination port. If the multicast message is destined to several VLANs and ports, the conventional network device will look up every VID and destination port associated with the VID in the VLAN group list by scanning the list of entries one by one. Once the destination ports are determined, the conventional network device forwards the multicast message to the destination ports associated with the VID. The conventional network device performs the above lookup-and-forward procedure until all VLANs associated with the multicast address are examined. The design philosophy is "lookup-based" from the perspective of individual VLANs. However, such implementation has the following drawbacks:

(1) The lookup-based per VLAN is a centralized and serialized processing, it does not fully utilize resources even though output queues on ports of the network device are available.

(2) There is a latency time between the VID lookup step and the forwarding step. The more VLANs associated with the multicast address, the more latency time is accumulated. It prevents the multicast messages from wire-speed transfer.

Accordingly, there is a need to provide a mechanism that efficiently distributes multicast messages among ports of a network device without degrading the performance of the network device.

SUMMARY OF THE INVENTION

One object of the present invention is to provide an apparatus for efficiently distributing multicast messages in a virtual local area network (VLAN) environment.

It is another object of the present invention to provide such an apparatus that efficiently forwards the multicast messages to destination ports of a network device on the basis of VLAN.

The foregoing objects are achieved in an apparatus for distributing multicast messages associated with a multicast address among ports of a network device on the basis of VLAN, where one or more VLANs within the network device are assigned to the multicast address. The apparatus comprises means for generating a group of multicast destination ports and a plurality of translation engines respectively associated with each port of the network device. The group of multicast destination ports is generated by collectively combining every multicast destination subset within all of the VLANs assigned to the multicast address on the network device. The apparatus further comprises a lookup engine and a forwarding engine coupled to the lookup engine. The lookup engine maps the multicast address to a bit string representing the group of multicast destination ports. The forwarding engine distributes the multicast messages to the group of multicast destination ports of the network device in accordance with the bit string. Each translation engine independently performs a VLAN identifier (VID) translation from a VID tag list in parallel on each port that belongs to the group of multicast destination ports.

Operationally, the lookup engine only needs to find out the group of multicast destination ports once, and report it to the forwarding engine. Thereafter, in response to the report of the lookup engine, the forward engine just distributes the multicast messages among all of the destination ports and those destination ports are active to perform their own VID translation and output queue mission in parallel. In this way, the present invention maximizes output queue resources as long as they are available. The present invention also achieves the shortest latency between lookup and forwarding the multicast messages.

BRIEF DESCRIPTION OF THE DRAWINGS

The present invention will become more fully understood from the detailed description given hereinbelow and the accompanying drawings, given by way of illustration only and thus not intended to be limitative of the present invention.

FIG. 1A is a diagram of a 3-D access model in accordance with the invention.

DETAILED DESCRIPTION OF THE PREFERRED EMBODIMENT

Figure 1:
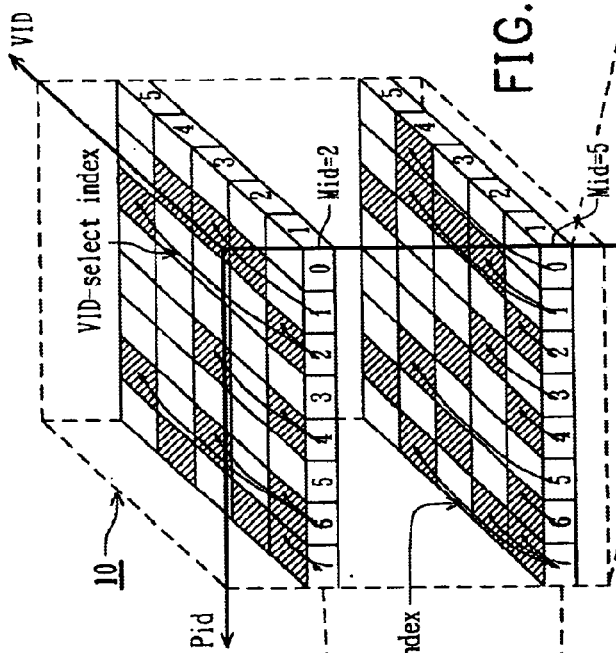
FIG. 1B is a diagram of a multicast table extracted from the 3-D access model.
FIG. 1C is a diagram of a port-based VID table extracted from the 3-D access model.

FIG. 1A is a diagram of a 3-D access model in accordance with the invention. The problems for multicasting messages across virtual local area network (VLAN), as described previously in the Background of the Invention section of this document, can be reduced to a 3-D lookup problem. The three axes of the 3-D access model 10 are multicast identifier (Mid), port identifier (Pid), and a VLAN identifier (VID). There is an auxiliary index called VID-select index for selecting the VID. The Mid is a unique index value assigned to each multicast address. Additionally, each port of a network device is assigned a corresponding Pid. The VID-select index can be derived from Mid and Pid (described below). The VID-select index selects the VID associated with the multicast address from a VID tag list. Each (Mid, Pid) maintains the corresponding VID tag list. FIG. 1B is a diagram of a multicast table extracted from the 3-D access model 10. The multicast table 20 has a number of entries, each of which is a bitmap 22 associated with the respective Mid. Each active bit ('1') of the bitmap maps to the VID-select index for each port of the network device. FIG. 1C is a diagram of a port-based VID table 30 extracted from the 3-D access model 10. The port-based table 30 includes a number of VID tag lists 32 respectively associated with each Pid.

Figure 2:
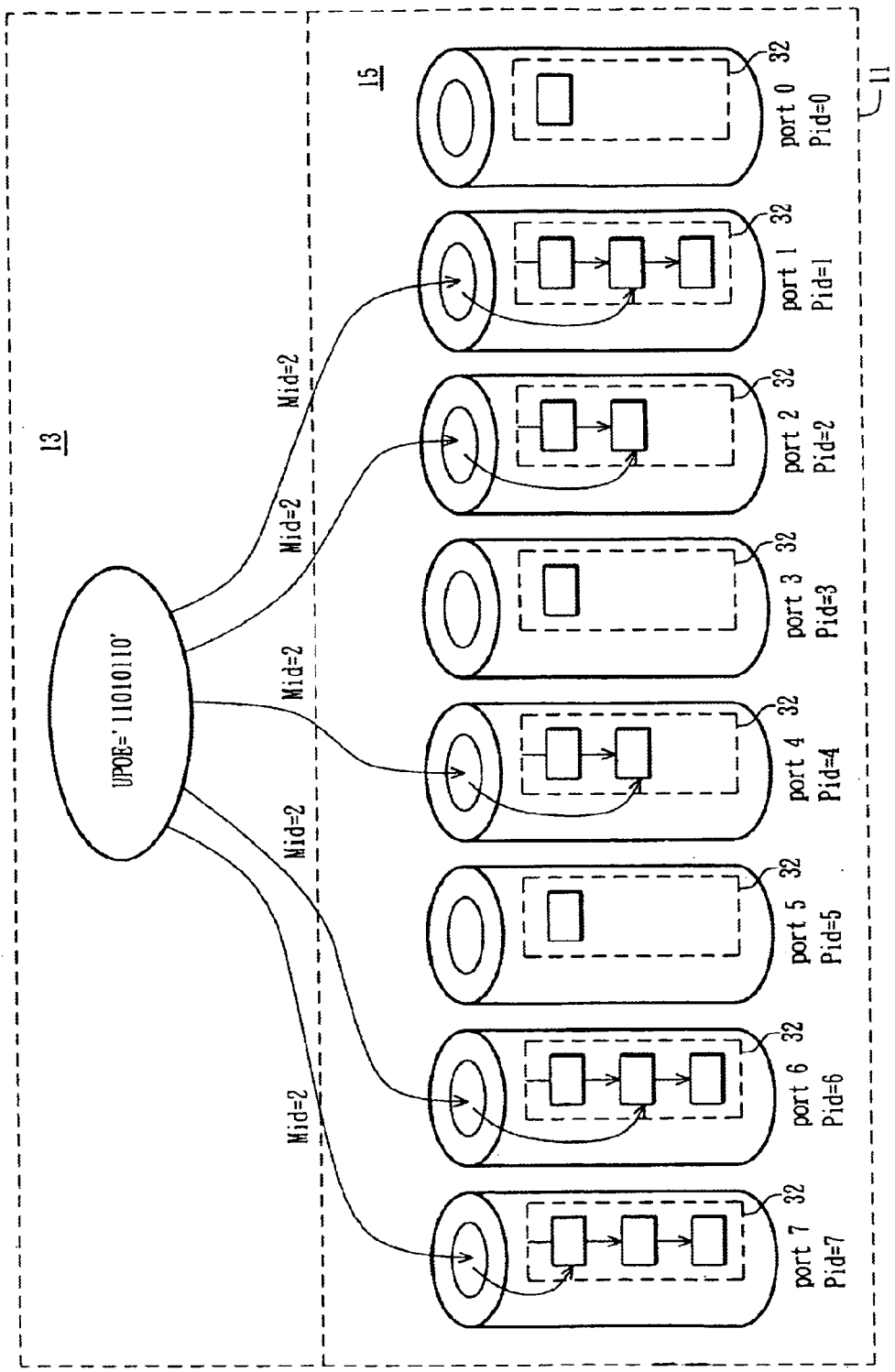
FIG. 2 is a diagram of a design model utilized in the presented invention.

A design model 11, based on the 3-D access model 10, is shown in FIG. 2. The design model 11 utilizes the spirit of "Single Instruction Stream, Multiple Data Stream (SIMD)" in a distributed processing domain. The design model 11 includes a lookup step 13 and a forwarding-translation step 15, wherein each port has its own VID tag list 32. The union of port-on-exit (UPOE) and Mid shown in FIG. 2 are set in advance (described below). UPOE stands for a group of multicast destination ports assigned to the multicast address, that is, every active bit in UPOE is a physical port destined to the multicast address from the system aspect. UPOE is generated by collectively combining all VLAN destination ports involved in the multicast. One of the key operations in present invention is to set a respective UPOE for each multicast group (address) as the single instruction stream in the SIMD design model. Another key operation is to perform VID translation in parallel on all of the destination ports, which can be thought of as the multiple data stream in the SIMD design model. These two key operations will be described in more detail below.

Referring now to FIG. 2, the lookup step 13 only needs to find out the UPOE and Mid associated with the multicast address once, and report them to the forwarding-translation step 15. Following that, in response to the report of the lookup step 13, the forwarding-translation step 15 just distributes the multicast messages among all of the destination ports and those destination ports are active to perform their own VID translation and output queue mission in parallel. In this way, the lookup step will be performed only once even though multiple VLANs are involved in this multicast forwarding. Then, the forwarding and VID translation steps are independently performed on each port in parallel. Aforementioned 3-D access model 10 is a conceptual model of VID translation, which illustrates an 8-port network device as an example and each port of the network device accommodates up to 4 VIDs.

Figure 3:
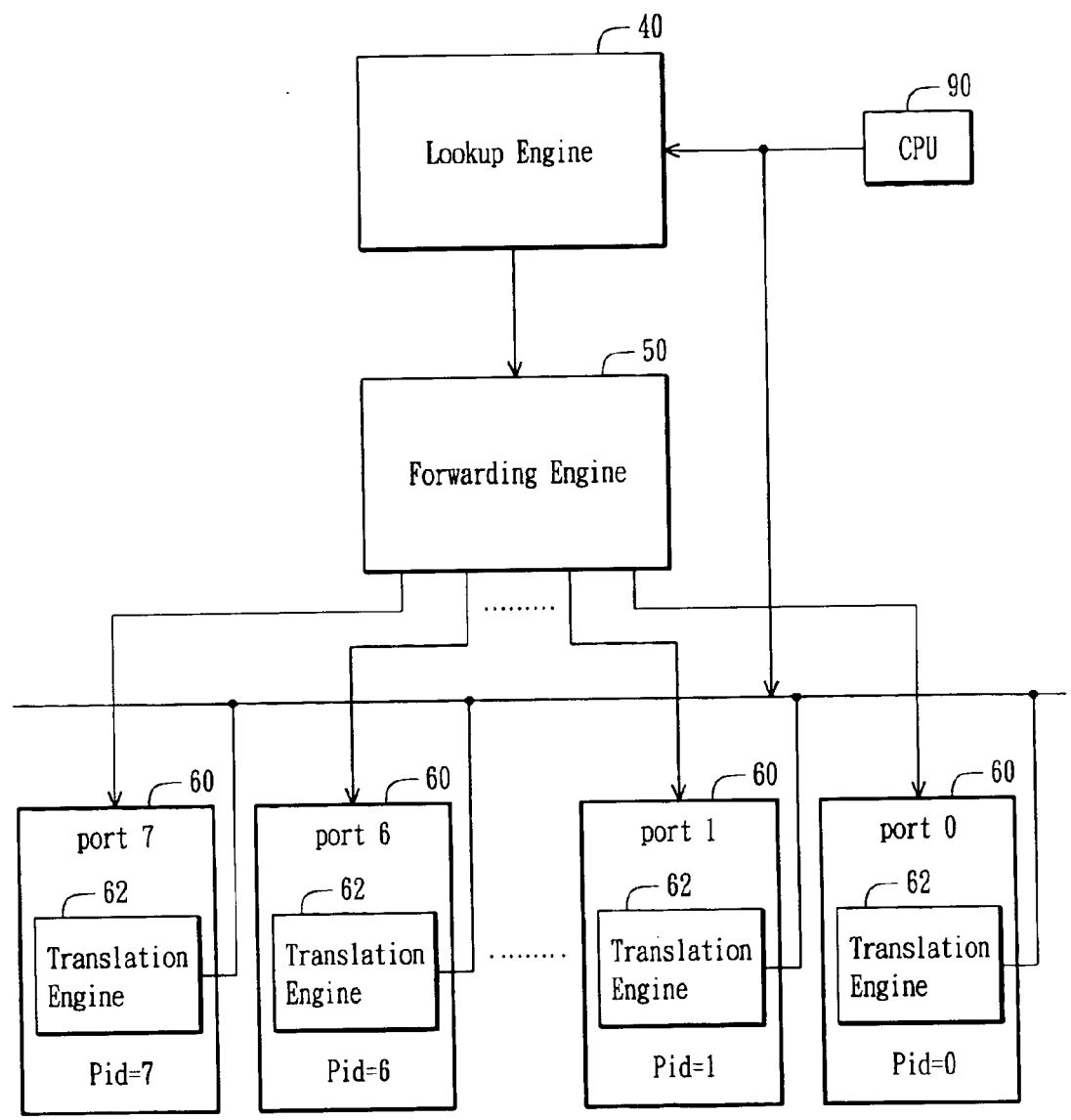
FIG. 3 is a block diagram illustrating the present invention.
Figure 4:
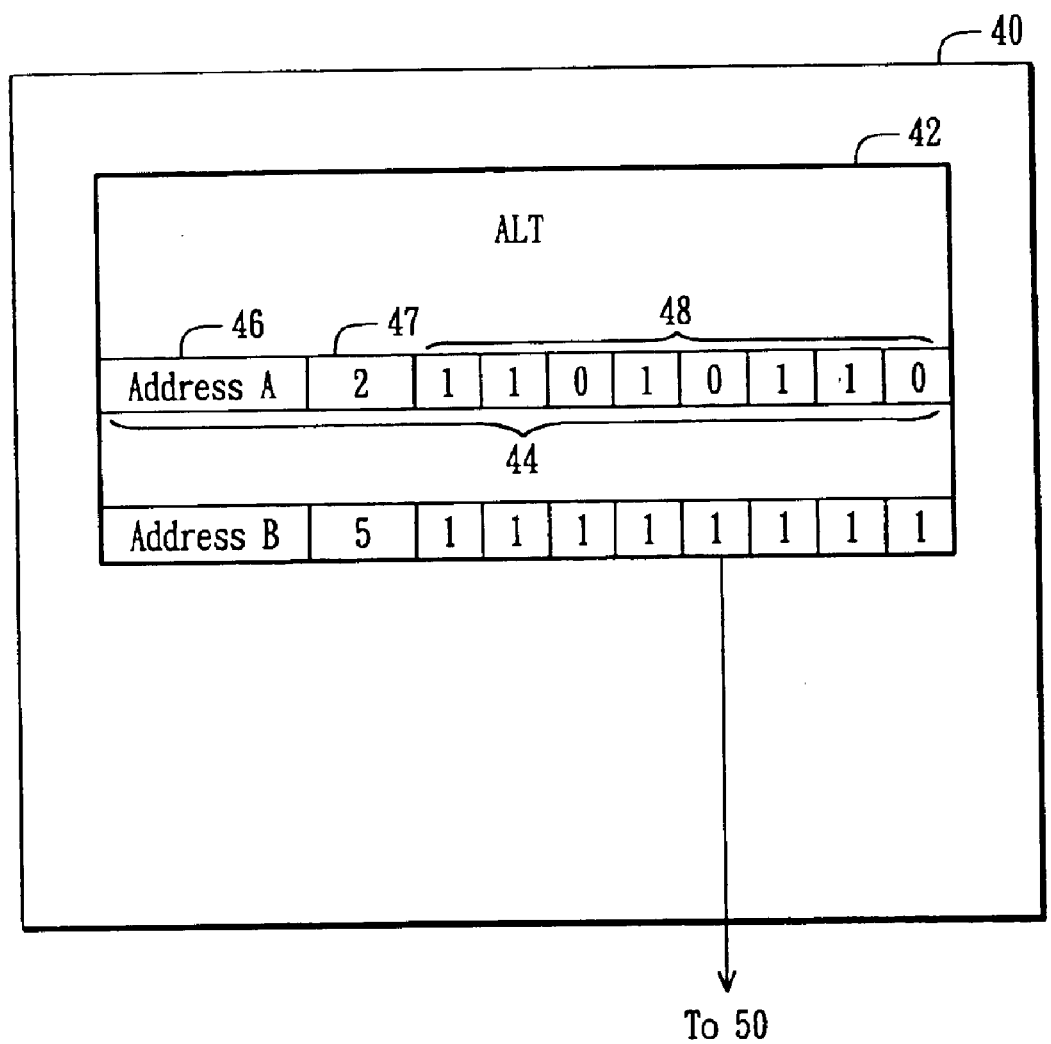
FIG. 4 is a block diagram illustrating the organization of an address lookup table (ALT)

A block diagram illustrating the network device (not shown) of the present invention in more detail is shown in FIG. 3. The network device has a preferred embodiment that includes a lookup engine 40, a forwarding engine 50 coupled to the lookup engine 40, and a plurality of ports 60 in communication with the forwarding engine 50. Each port 60 includes a translation engine 62. Referring to FIG. 4, the lookup engine 40 preferably contains an address lookup table 42 (ALT) having a plurality of entries 44 each of which comprises a search key 46, a unique index value 47 and a bit string 48. The search key 46 is the multicast address, and matching scheme of the search key could be hash-based or content addressable memory (CAM)-based depending on ALT implementation. However, it should be understood to those skilled in the art that other techniques capable of searching the ALT are contemplated by the principles of the invention. The unique index value 47 denotes the Mid assigned to the multicast address. The UPOE associated with the multicast address is stored in the bit string 48. The bit string 48 functions as a port mask, each bit of the bit string 48 corresponds to a specific port of the network device. The multicast messages are forwarded to the group of destination ports of the network device according to the port mask. For example, if the bit string 48 stores a value that is equal to '11010110', it means that Pid=1, Pid=2, Pid=4, Pid=6, and Pid=7 are physical destination ports of the network device in accordance with the multicast address.

Figures 5A, 5B:
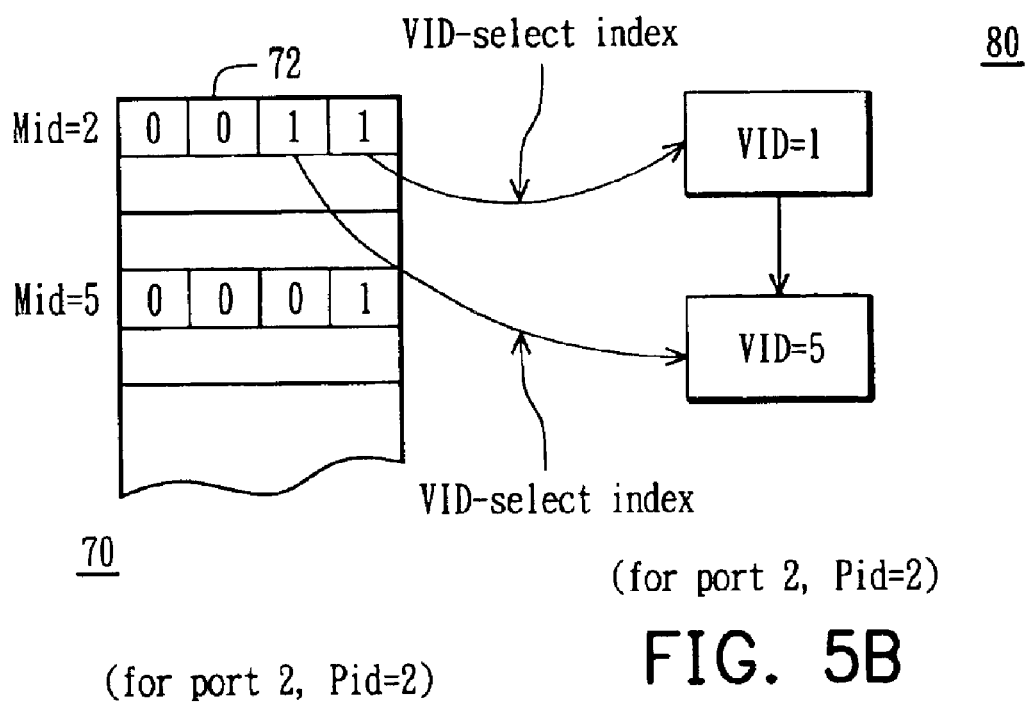
FIG. 5A is a diagram of a VID-select bitmap table derived from the multicast table.
FIG. 5B is a diagram of a VID tag list derived from the port-based VID table.

Referring to FIG. 5A and FIG. 5B, a VID-select bitmap table 70 and a VID tag list 80 embody the concept of 3-D access model as shown in FIG. 1A from the aspect of distributed processing. It means that each port has its own VID-select information and VID tag list, and each port independently forwards and performs VID translation in parallel. The VID-select bitmap table 70 and the VID tag list 80 both are associated with each port of the network device, for example, port 2 (Pid=2) illustrated in FIG. 5A~5B. Each port of the preferred embodiment has its own VID-select bitmap table 70 and VID tag list 80. According to the unique index value 47 (Mid) assigned to the multicast address, a VID-select bitmap 72 is selected from the VID-select bitmap table 70 as a selection mask to access the VID tag list 80. Each active bit of the selection mask is indicative of the VID-select index, and the VID-select index selects the corresponding VID associated with the multicast address from the VID tag list. For example, the VID-select bitmap 72 of port 2 is '0011', i.e. bit 1 and bit 0 are active to select to VIDs from VID tag list of port 2. As a result of VID selection, port 2 tags VID=1 and VID=5 successively on the outgoing multicast message.

Referring again to FIGS. 3, 4, and 5A–5B, upon receiving an Internet Group Management Protocol (IGMP) service request, the CPU 90 reconfigures the lookup engine 40 and all of the translation engines 62 at once. That is, the CPU 90 stores a new multicast address as the search key 46 in the ALT 42 of the lookup engine 40. The CPU 90 also assigns a unique index value 47 to the new multicast address while a multicast group is created and stores the Mid (e.g., unique index value 47) in the ALT 42. The CPU 90 further associates destination ports with the multicast address and stores the destination ports in the bit string 48. In response to the IGMP request, all of the VID-select bitmap tables 70 and the VID tag lists 80 included in every translation engine are updated and modified by CPU 90 as necessary.

Suppose that one multicast address A, for example, is forwarded to the following VLANs:

VID=1, where its POE=POE$_1$='11010100'
VID=3, where its POE=POE$_2$='01010010'
VID=5, where its POE=POE$_3$='01000100'

Wherein the POE denotes a multicast destination subset within VLAN, which consists of one or more destination ports assigned from the ports of the network device. For example, POE$_3$='01000100' indicates that Pid=2 and Pid=6 are destination ports of an 8-port network device associated with VLAN 5 (VID=5). A UPOE associated with the multicast address (e.g., the group of multicast destination ports) can be collectively combined with every multicast destination subset within all of the VLANs assigned to the multicast address on the network device. Therefore, the UPOE is the logical OR of the multicast destination subsets assigned to the multicast address A. Accordingly, the UPOE destined to the multicast address in this example can be achieved by $$UPOE = POE_1 \text{ or } POE_2 \text{ or } POE_3$$
$$= \text{'11010100' or '01010010' or '01000100'}$$
$$= \text{'11010110'}$$

However, it should be understood that other techniques capable of achieving the UPOE are contemplated by the principle of the invention. The multicast address A is assigned to a unique index value 47 (Mid), for example, Mid=2 and stored in ALT 42. The UPOE is stored in bit string 48 of ALT 42. For the multicast address A, the CPU 90 sets all the related information (the search key 46, the unique index value 47, the bit string 48, the VID-select bitmap 72, and the VID tag list 80 of each port) in advance.

Upon receiving the multicast messages associated with the multicast address A, the lookup engine 40, from ALT 42, needs to map the multicast address A to the Mid=2 and the bit string 48 containing the UPOE only once. As mentioned previously, the UPOE represents the group of multicast destination ports in the aspect of union of involved VLAN POEs. Subsequently, the forwarding engine distributes the multicast messages and the Mid to the group of multicast destination ports of the network device in accordance with the UPOE, wherein the group of multicast destination ports' Pids are Pid=1, Pid=2, Pid=4, Pid=6, and Pid=7. After that, each translation engine independently performs a VID translation in parallel on each port of the network device. The translation engine of port 2 (Pid=2), as an example, can obtain the VID-select bitmap 72 from the VID-select bitmap table 70 according to Mid=2, and then fetches the first VID-select index from the VID-select bitmap 72. Next, the translation engine fetches the first VID associated with the multicast address from the VID tag list 80 in accordance with the first VID-select index. Following that, the port tags VID=1 on the outgoing multicast messages and performs its output queue mission. Again, the translation engine of port 2 fetches the second VID-select index from the VID-select bitmap 72, and then fetches the second VID associated with the multicast address from the VID tag list 80 according to the second VID-select index. The port also tags VID=5 on the outgoing multicast messages and performs the output queue mission. Each port of the network device performs the similar procedures described above in parallel until each port examines all of bits of respective VID-select bitmap 72. Note that the 8-port network device is used for illustration purpose and that one skilled in the networking art could apply the principles of the present invention to a network device of arbitrary size.

Figure 6:
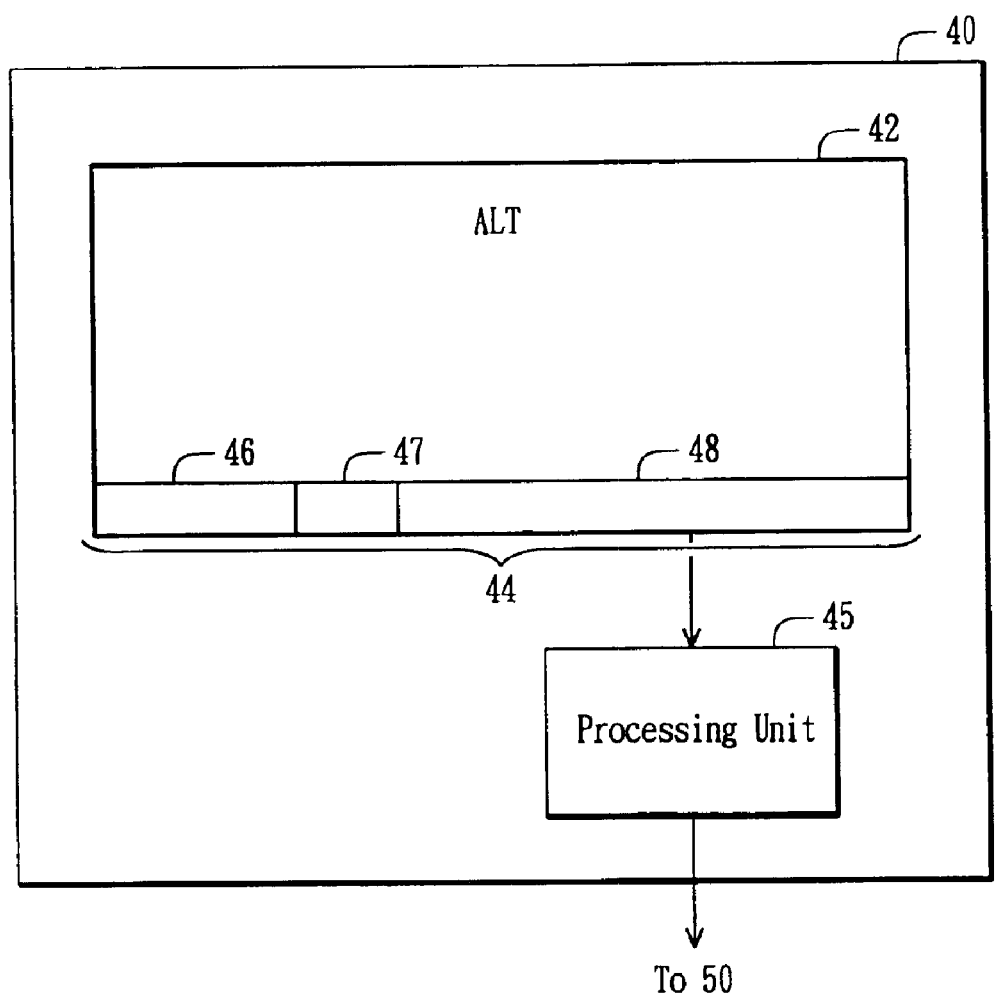
FIG. 6 is a block diagram of a lookup engine comprising a processing unit that performs link aggregation.

In an alternative embodiment of the invention, referring to FIG. 6, the lookup engine 40 further includes a processing unit 45 that preferably performs link aggregation complied with the IEEE 802.3ad standard. The processing unit 45 aggregates multiple ports to support higher bandwidth connections and provide additional network resilience.

As described in detail above, the present invention provides a novel apparatus that facilitates multicast messages across VLANs.

It will also be recognized by those skilled in the art that, while the invention has been described above in terms of one ore more preferred embodiments, it is not limited thereto. Various features and aspects of the above-described invention may be used individually or jointly. Further, although the invention has been described in the context of its implementation in a particular environment and for particular purpose, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. An apparatus for distributing multicast messages associated with a multicast address among ports of a network device on the basis of a virtual local area network (VLAN), one or more VLANs within the network device are assigned to the multicast address, each VLAN having a multicast destination subset which includes one or more destination ports assigned from the ports of the network device, the apparatus comprising:

a means for generating a group of multicast destination ports by collectively combining every multicast destination subset within all of the VLANs assigned to the multicast address on the network device; and a plurality of translation engines respectively associated with each port of the network device, each translation engine independently performing a VLAN identifier (VID) translation in parallel on each port which belongs to the group of multicast destination ports;

wherein the group of multicast destination ports are all of the destination ports assigned to the multicast address on the network device.

2. The apparatus as claimed in claim 1, the apparatus further comprises:

a lookup engine for mapping the multicast address to a unique index value assigned to the multicast address and a bit string representing the group of multicast destination ports;

a forwarding engine coupled to the lookup engine, the forwarding engine distributing the unique index value and the multicast messages to the group of multicast destination ports of the network device in accordance with the bit string.

3. The apparatus as claimed in claim 2, wherein each translation engine associated with each port translates the VID from the unique index value and a VID-select index.

4. The apparatus as claimed in claim 2, wherein the lookup engine comprises an address lookup table having a plurality of entries each of which comprises the multicast address, the unique index value, and the bit string.

5. The apparatus as claimed in claim 2, wherein the bit string functions as a port mask, wherein each bit of the port mask corresponds to a specific port of the network device, and wherein the multicast messages are forwarded to the group of destination ports of the network device in accordance with the port mask.

6. The apparatus as claimed in claim 2, wherein each translation engine comprises:

a VID tag list corresponding to each port of the network device; and a VID-select table containing a plurality of VID-select bitmap each of which corresponds to the unique index value, wherein each VID-select bitmap functions as a selection mask for the corresponding port, wherein each active bit of the selection mask is indicative of the VID-select index for each port of the network device, and wherein the VID-select index selects the corresponding VID associated with the multicast address from the VID tag list.

7. The apparatus as claimed in claim 6, wherein every VID-select index is respectively fetched from the VID-select bitmap corresponding to the unique index value on each port of the network device.

8. The apparatus as claimed in claim 2, wherein the lookup engine further comprises means for performing link aggregation complied with the 802.3ad standard.

9. A method of distributing multicast messages associated with a multicast address among ports of a network device on the basis of virtual local area network (VLAN), one or more VLANs within the network device are assigned to the multicast address, each VLAN having a multicast destination subset which consists of one or more destination ports assigned from the ports of the network device, the method comprising the steps of:

A. providing a group of multicast destination ports, a unique index value, one or more VID-select indices assigned to each destination port, and a plurality of VLAN identifier (VID) tag lists respectively associated with each port of the network device;

B. looking up the group of multicast destination ports and the unique index value assigned to the multicast address in an address lookup table;

C. forwarding the multicast messages to the group of multicast destination ports of the network device; and D. translating one or more VLAN identifiers (VIDs) on each port in parallel and independently from the unique index value, one or more VID-select indices and the VID tag list corresponding to each port of the network device;

wherein the group of multicast destination ports are all of the destination ports assigned to the multicast address on the network device;

wherein the unique index value is assigned to the multicast address;

wherein the VID-select indices are associated with the unique index value.

10. The method as claimed in claim 9, wherein the step A comprises the steps of:

A1. generating the group of multicast destination ports assigned to the multicast address by collectively combining every multicast destination subset within all of the VLANs assigned to the multicast address on the network device;

A2. storing the group of multicast destination ports, the unique index value, and the multicast address in one of a plurality of entries of the address lookup table, wherein the group of multicast destination ports are stored in a bit string of the entry; and A3. storing the VID-select indices in one of a plurality of VID-select bitmap of a VID-select bitmap table.

11. The method as claimed in claim 10, wherein the steps A1~A3 are performed in response to the Internet Group Management Protocol (IGMP) service request.

12. The method as claimed in claim 10, wherein the step D comprises the steps of:

D1. selecting the VID-select bitmap corresponding to the unique index value from the VID-select bitmap table;

D2. fetching one of the VID-select indices from the VID-select bitmap independently on each port of the network device;

D3. fetching the VID associated with the multicast address independently on each port of the network device, according to the VID-select index from step D2 and the VID tag list corresponding to each port;

D4. repeating step D2 and D3 until each port of the network device examines all of bits of the VID-select bitmap.

13. The method as claimed in claim 9 further comprising the step of:

E. tagging the related VID on the outgoing multicast messages independently on every destination port of the network device.

14. The method as claimed in claim 9, wherein the step B further comprises the step of performing link aggregation complied with the 802.3ad standard.

* * * * *